United States Patent
Muller et al.

(10) Patent No.: US 12,191,466 B2
(45) Date of Patent: Jan. 7, 2025

(54) HEAT EXCHANGER FOR AN ELECTRICAL COMPONENT, AND ASSEMBLY OF SAID HEAT EXCHANGER AND COMPONENT

(71) Applicant: Valeo Systemes Thermiques, Le Mesnil Saint Denis (FR)

(72) Inventors: Jean Damien Muller, La Suze sur Sarthe (FR); Frédéric Tison, La Suze sur Sarthe (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 733 days.

(21) Appl. No.: 17/299,522

(22) PCT Filed: Jul. 16, 2019

(86) PCT No.: PCT/FR2019/051773
§ 371 (c)(1),
(2) Date: Jun. 3, 2021

(87) PCT Pub. No.: WO2020/115376
PCT Pub. Date: Jun. 11, 2020

(65) Prior Publication Data
US 2022/0029221 A1   Jan. 27, 2022

(30) Foreign Application Priority Data
Dec. 4, 2018   (FR) ..................... 1872324

(51) Int. Cl.
| | |
|---|---|
| *H01M 10/6555* | (2014.01) |
| *H01M 10/625* | (2014.01) |
| *H01M 10/643* | (2014.01) |
| *H01M 10/6567* | (2014.01) |

(52) U.S. Cl.
CPC ..... *H01M 10/6555* (2015.04); *H01M 10/625* (2015.04); *H01M 10/643* (2015.04); *H01M 10/6567* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2011/0129716 A1* | 6/2011 | Chung | H01M 50/204 |
| | | | 429/120 |
| 2013/0040175 A1 | 2/2013 | Yang et al. | |
| 2016/0372804 A1* | 12/2016 | Koch | H01M 10/6567 |
| 2018/0337434 A1 | 11/2018 | Burgers et al. | |

FOREIGN PATENT DOCUMENTS

| | | |
|---|---|---|
| CN | 101636630 A | 1/2010 |
| CN | 102893449 A | 1/2013 |
| CN | 104736960 A | 6/2015 |
| CN | 106104194 A | 11/2016 |
| CN | 107429978 A | 12/2017 |
| CN | 107735898 A | 2/2018 |
| DE | 102012021990 A1 | 7/2013 |
| DE | 102012217869 A1 | 4/2014 |

OTHER PUBLICATIONS

International Search Report with Written Opinion in corresponding International Application No. PCT/FR2019/051773, mailed Sep. 11, 2019 (10 pages).
Office Action issued in counterpart Chinese Application No. 201980090651.5, dated Oct. 26, 2023 (7 pages).

* cited by examiner

*Primary Examiner* — Tracy M Dove
(74) *Attorney, Agent, or Firm* — Osha Bergman Watanabe & Burton LLP

(57) ABSTRACT

A heat exchanger for an electrical component, said exchanger comprising a first body (28) defining at least a primary channel (30) and a secondary channel (32), which are parallel and adjacent, in which fluid circulates in series from the primary channel (30) to the secondary channel (32), in opposite directions, said first body (28) having at least one exchange surface for exchanging heat between the fluid circulating in said channels (30, 32) and said component, a width of the primary channels (30) being less than a width of the secondary channels (32).

11 Claims, 4 Drawing Sheets

[Fig.1]
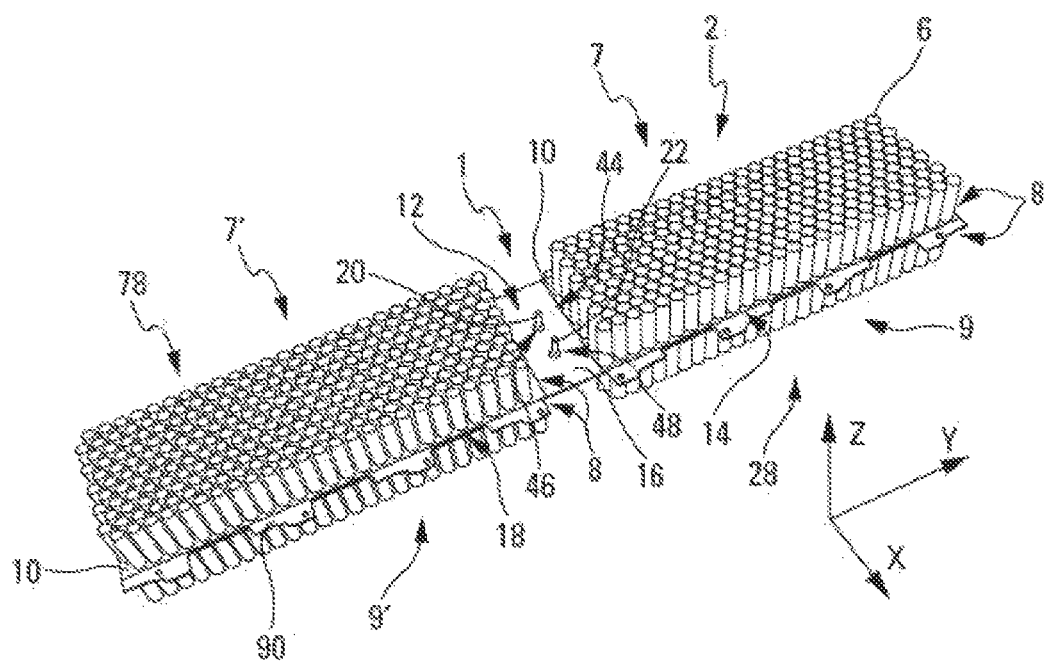
[Fig.2]
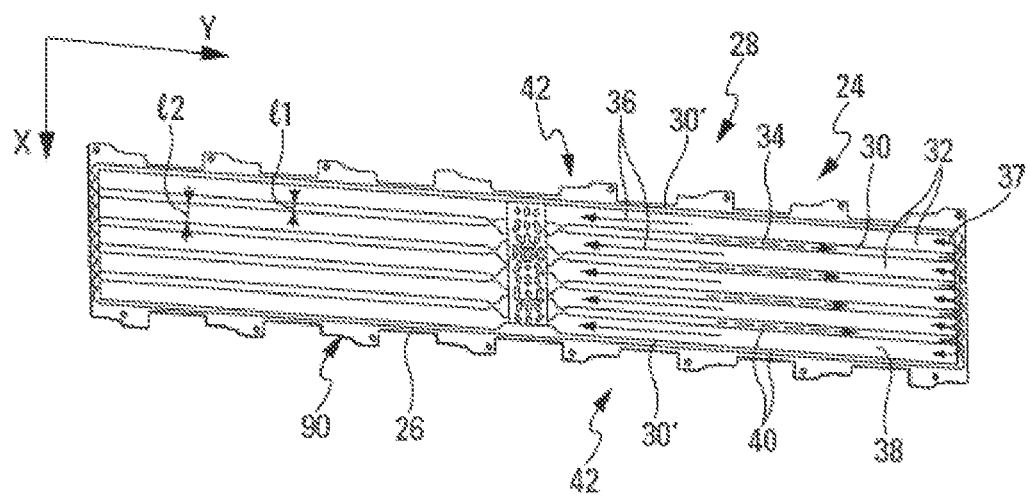

[Fig.3]
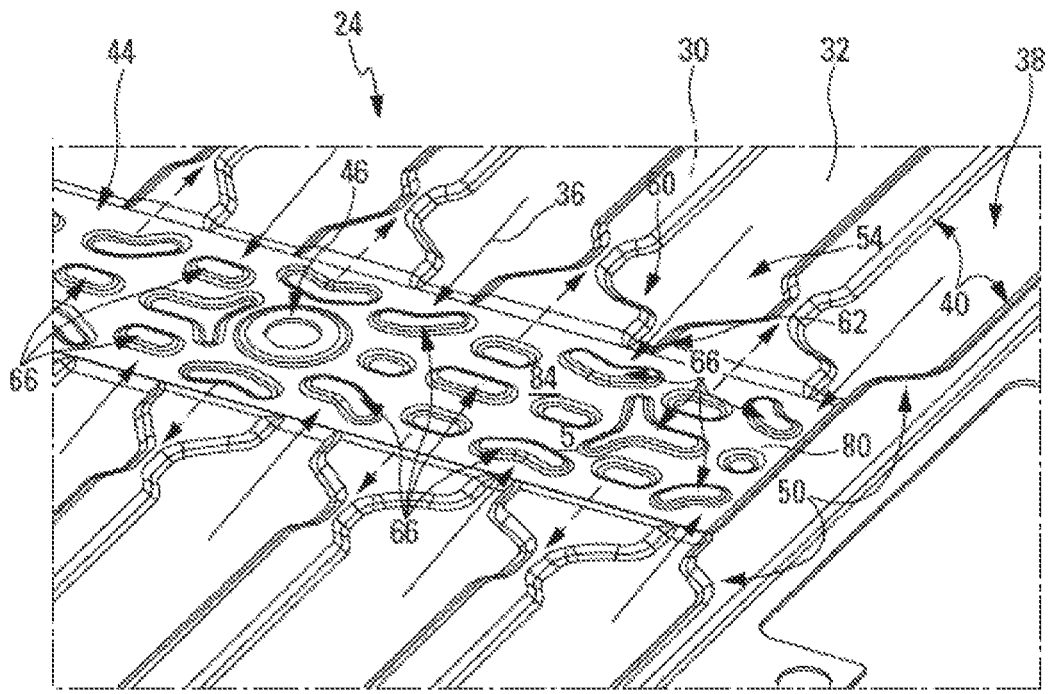
[Fig.4]
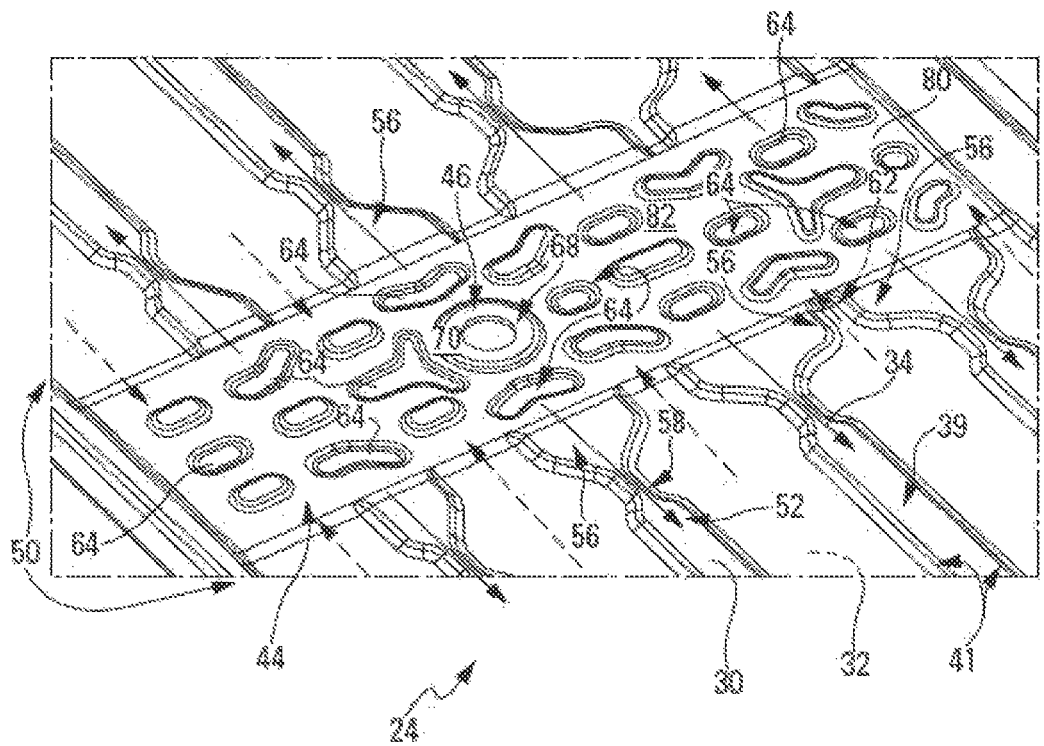

[Fig.5]
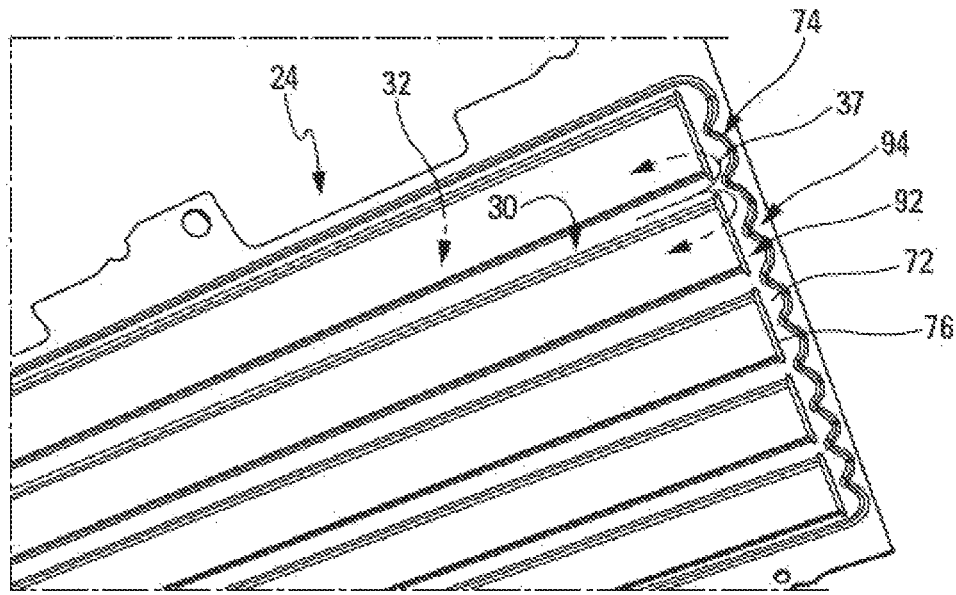
[Fig.6]
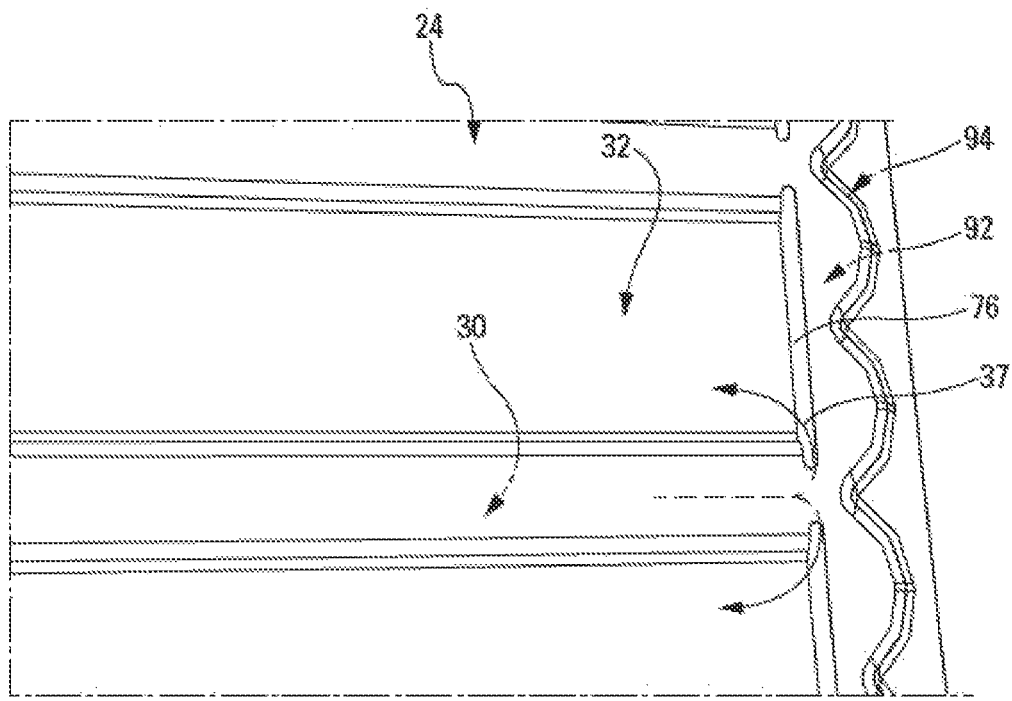

[Fig.7]
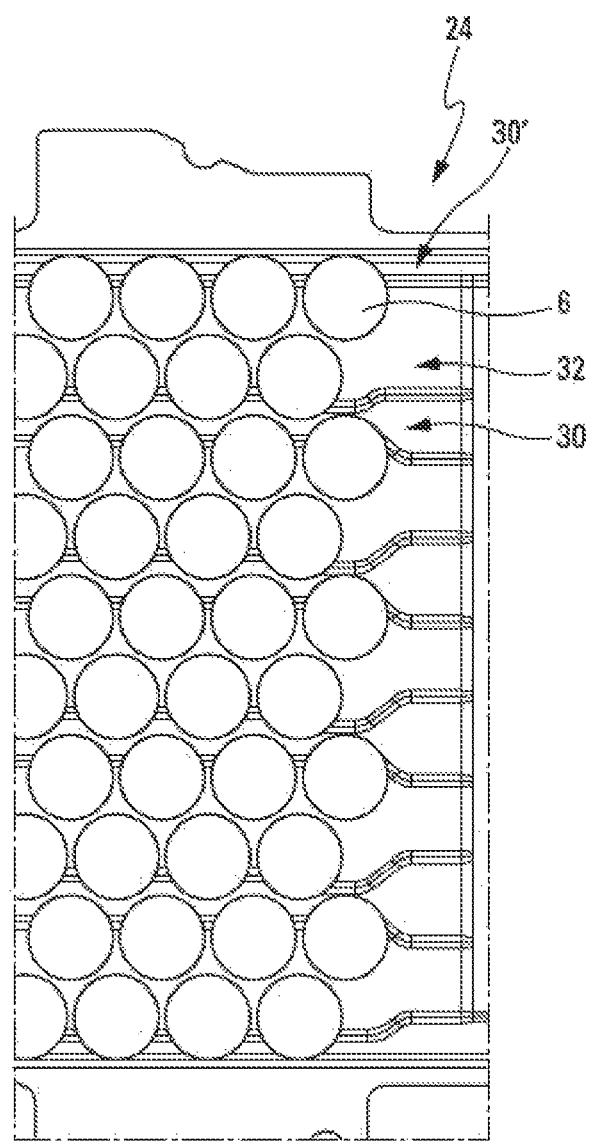

HEAT EXCHANGER FOR AN ELECTRICAL COMPONENT, AND ASSEMBLY OF SAID HEAT EXCHANGER AND COMPONENT

The present invention relates to a heat exchanger for an electrical component, typically for cells of a battery. Said component may also be an electronic power component. Said exchanger may be used both for cooling and for heating the electrical component. The invention is intended, in particular, for motor vehicles, especially for electric or hybrid motor vehicles.

The applicant has already proposed, in a patent application not published as at the date of the present application, a heat exchanger comprising a body defining primary channels and secondary channels, which are parallel and adjacent, in which fluid circulates in series from the primary channels to the secondary channels, following a U-shaped circulation path. Cells of a battery to be cooled or heated are arranged on each face of the body on heat exchange surfaces for exchanging heat between the fluid circulating in said channels and said cells.

Such a configuration is advantageous in that it makes it possible to cool or to heat a high number of cells while optimizing compactness.

For the battery to function properly, it is necessary for the difference in temperature between the coolest cell and the warmest cell to be less than 5° C.

To this end, in the abovementioned patent application, each cell is located facing one of the primary channels and one of the secondary channels. To be specific, in the case of cooling of the cells, the fluid is heated along said channels by exchanging heat with the cells in such a way that its temperature is a priori at a minimum at the inlet of the primary channels and at a maximum at the outlet of the secondary channels. Thus, by positioning each cell facing both one of the primary channels and one of the secondary channels, all of the cells are a priori cooled by a portion of cooler fluid and a portion of warmer fluid in such a way that the exchange of heat with the fluid can be expected to average out uniformly for all of the cells.

However, with the configuration of the channels shown in this patent application, since the primary channels and the secondary channels are of identical width, it was observed that the exchange of heat did not take place as predicted, at the expense of limitation of the difference in temperature between the coolest cell and the warmest cell.

More specifically, the applicant was able to verify that, owing to an excessive rise in temperature of the fluid in the primary channels, exchanges of heat occurred between the fluid circulating in the primary channels and the fluid, which had become too warm, circulating in the secondary channels, the expected averaging out thus being limited.

The invention is based on these observations and aims to solve, at least partially, the problems described above by proposing a heat exchanger for an electrical component, said exchanger comprising a first body defining at least a primary channel and a secondary channel, which are parallel and adjacent, in which fluid circulates in series from the primary channel to the secondary channel, in opposite directions, said first body having at least one exchange surface for exchanging heat between the fluid circulating in said channels and said component, a width of the primary channels being less than a width of the secondary channels.

The term "exchange surface" means a surface facing which the component to be cooled or heated is intended to extend.

By limiting the width of the primary channels, the exchange of heat between the component and the fluid circulating in said primary channels is thus limited. This promotes a gradual change in the temperature of the fluid all along its circulation path between an inlet of the primary channels as far as an outlet of the secondary channels. It is thus possible to have, on the surface of the body, zones offering an average exchange of heat with the fluid which is relatively stable for all of the zones.

According to particular embodiments, the exchanger comprises one or more of the following features, considered individually or in any technically possible combination:
- said primary and secondary channels have a constant width,
- a width ratio between the secondary channel(s) and the primary channel(s) is between 1.5 and 4, preferably 2,
- said primary channels and said secondary channels are arranged such that they are alternating,
- the heat-transfer fluid is preferably glycolated water, and/or a coolant
- said primary channels and said secondary channels are arranged facing the whole of the exchange surface,
- the first body has two longitudinal edges, each bordered by two primary semi-channels,
- said exchange surface is substantially rectangular,
- the exchanger comprises a manifold for circulation of the fluid to the primary channels and/or from the secondary channels,
- said manifold has an inlet and/or an outlet for the passage of the fluid,
- the first body comprises a connection zone located between the manifold and an inlet of the primary channels and/or between an outlet of the secondary channels and the manifold,
- said connection zone comprises first convergent portions for the passage of the fluid between the manifold and the inlet of the primary channels,
- said first convergent portions comprise a primary neck in communication with the inlet of the primary channels,
- said primary necks extend in a direction of longitudinal extension of said primary channels,
- a width of the primary necks differs depending on how close said primary necks are to the fluid inlet of the manifold, one of the primary necks, closer to said inlet of the manifold, having a smaller width than one of the primary necks which is further away from said inlet of the manifold,
- said connection zone comprises second convergent portions for the passage of the fluid between the manifold and the outlet of the secondary channels,
- said second convergent portions comprise a secondary neck in communication with the manifold,
- the secondary necks are between the first convergent portions,
- said secondary necks extend in a direction of longitudinal extension of said secondary channels,
- a width of the secondary necks differs depending on how close said secondary necks are to the fluid outlet of the manifold, one of the secondary necks, closer to said outlet of the manifold, having a smaller width than one of the secondary necks which is further away from said outlet of the manifold,
- said manifold comprises primary stamped portions for controlling the flow of fluid between the inlet of the manifold and the primary channels and/or secondary stamped portions for controlling the flow of fluid between the secondary channels and the outlet of the manifold, said manifold comprises a stamped portion, referred to as the inlet stamped portion, creating a fluid distribution chamber in the vicinity of the inlet of the manifold, said inlet stamped portion is oriented identically to the secondary stamped portions, said inlet stamped portion has an annular configuration, said inlet stamped portion and the convergent portion associated with one of the primary channels, located in the vicinity of said inlet of the manifold, are in the continuity of one another, the exchanger comprises a second body symmetrical to the first body about the manifold, the exchanger comprises a stack of plates, the stack of plates defines said manifold, said first body and/or said second body, the stack comprises an intermediate plate, said intermediate plate is stamped, the intermediate plate has corrugations for defining a bottom and side walls of the primary and/or secondary channels, of the first and second convergent portions, of the primary and/or secondary necks and/or of the primary, secondary and/or inlet stamped portions, the side walls of the channels are substantially straight, said intermediate plate defines a bottom and side walls of collector boxes for passage of the fluid from the primary channels to the secondary channels, said collector box has hollows forming deflector surfaces for guiding the fluid in said box from one of the primary channels to the neighboring secondary channels, said intermediate plate has, at said collector boxes, slots, each slot being located facing an emerging end of one of the secondary channels, said stack of plates further comprises a first outer plate facing which a first part of the cells are intended to be positioned, on a first face of said exchanger, said stack of plates further comprises a second outer plate facing which another part of the cells are intended to be positioned, on a second face of said exchanger, opposite the first face, the first outer plate has a flat bottom and raised edges the second outer plate is flat, the intermediate plate has a flat peripheral edge, sandwiched between the raised edges of the first outer plate and a peripheral edge of the second outer plate, said exchanger has inlet and outlet connectors, respectively in relation to the inlet and the outlet of the manifold.

The invention also relates to an assembly of an electrical component and a heat exchanger as described above.

According to particular embodiments, said assembly comprises one or more of the following features, considered individually or in any technically possible combination:

the component is in contact with said first body and/or said second body facing said primary and secondary channels, the component comprises cells of an electric storage battery, the cells face both one of the primary channels and one of the secondary channels, the cells are located on each side of said first body and/or of said second body.

Purely by way of illustration, a detailed example will now be described, on the basis of the figures, in which:

FIG. 1 is a perspective view of a heat exchanger according to one embodiment of the invention, with electric battery cells on the two faces thereof;

FIG. 2 is a face-on view of an intermediate plate of said exchanger;

FIG. 3 is a perspective view of a central part of the intermediate plate of FIG. 2, seen from above;

FIG. 4 is a perspective view of the central part of the intermediate plate of FIG. 2, seen from below;

FIG. 5 is a perspective view of a longitudinal end part of the intermediate plate of FIG. 2, seen from above;

FIG. 6 is a perspective view of the longitudinal end part of FIG. 5, seen from below, FIG. 7 shows a transparent view from above of the relative positions of the electric cells and the fluid circulation channels of an exchanger, in a configuration according to the invention.

As shown in FIG. 1, the invention relates to a heat exchanger 1 for an electrical component 4, in particular for an electrical component of a motor vehicle.

The component 4 is in this case formed of an electric storage battery comprising electric cells 6. Said cells are electrically connected in series and/or in parallel, for example at one end thereof. Said cells are, for example, cylindrical, of circular cross section.

Note that the cells are in this case distributed in four groups, two upper groups 7, 7 and two lower groups 9, 9'.

Said cells 6 are preferably distributed regularly in rows oriented in a first direction X, the various rows succeeding one another in a second direction Y, perpendicular to the direction X. The cells are staggered from one row to the next.

The component 4 is in contact with said exchanger 1. In other words, in this case the cells 6 are in contact with said exchanger 1, for example via one end thereof, namely the end opposite the end via which they are electrically connected. Also in other words, the cells 6 are in contact with the exchanger via a surface forming a disk.

Said exchanger defines one or more exchange surfaces 8, in this case four, each corresponding to one of the groups 7, 7, 9, 9' of cells 6. The term "exchange surface" thus means a surface facing which the component 4 to be cooled or heated is intended to extend. Note that, in this case, the exchange surfaces are substantially rectangular.

Said exchanger preferably comprises a contact layer 10 between said cells 6 and the exchange surfaces 8. Said contact layer 10 is made of a thermally conductive material. Said material is advantageously deformable so as to absorb any manufacturing disparities between the different cells 6 and/or a deformation of material owing to differential thermal expansion. It preferably consists of a thermal adhesive for mechanically holding the various cells 6 on the exchange surfaces 8.

Said exchanger preferably comprises a stack of plates, said plates being stacked in a direction Z, at right angles to the directions X and Y. In other words, said plates extend substantially in said directions X and Y. The exchanger has a thickness, in the direction Z, which is much smaller than its length, in the direction Y, and its width, in the direction X.

Said plates are, for example, made of aluminum and/or aluminum alloy. They are assembled, in particular, by brazing.

The stack in this case comprises a first outer plate 12 facing which a first part of the cells 6 is positioned on a first face 14 of said exchanger. Said first outer plate 12 in this case defines two of the exchange surfaces 8, corresponding to the upper groups 7, 7' of cells 6.

The stack further comprises a second outer plate, which is not visible, facing which another part of the cells 6 is positioned, on a second face of said exchanger, opposite the first face 14 of the exchanger. Said second outer plate in this case defines two more exchange surfaces 8, corresponding to the lower groups 9,9' of cells 6.

The first outer plate 12 has a substantially flat bottom 16 and raised edges 18. The exchange surfaces 8, corresponding to the upper groups 7, 7' of cells 6, are positioned on said bottom 16 of the first outer plate 12 and the corresponding contact layers 10 are located between said bottom 16 of the first outer plate 12 and each of the upper groups 7,7' of cells 6.

The second outer plate is flat. The contact layers 10 corresponding to said other exchange surfaces 8 are located between said second outer plate and each of the lower groups 9, 9' of cells 6.

The first outer plate 12 and the second outer plate between them define a volume inside which a heat-exchange fluid, in particular a heat-transfer fluid, such as glycolated water and/or coolant, running through the exchanger is intended to circulate.

For the circulation of said fluid, said exchanger also has, in this case, inlet 20 and outlet 22 connectors in relation to the interior volume defined between the first outer plate 12 and the second outer plate. Said inlet 20 and outlet 22 connectors are substantially on the same straight line oriented in the direction X.

Preferably, the heat exchanger further comprises flanges 90 for attachment to a support.

As shown in FIG. 2, the stack of plates comprises an intermediate plate 20, preferably stamped.

The intermediate plate 24 has a flat peripheral edge 26, sandwiched between the raised edges 18 of the first outer plate 12 and a peripheral edge of the second outer plate. In other words, said intermediate plate 24 extends within the interior volume defined between the first outer plate 12 and the second outer plate. These features promote a good seal of the stack of plates. The circulation of the fluid through the exchanger will now be described.

Said exchanger comprises a first body 28 defined in this case by a part of the stack of plates, specifically a part located on the right hand side in FIGS. 1 and 2.

Said body 28 defines at least a primary channel 30 and a secondary channel 32, which are parallel and adjacent. Said channels extend in said second direction Y.

In said primary and secondary channels, the fluid circulates in series from the primary channel 30 to the secondary channel 32, in opposite directions, as shown by the arrows marked 34 corresponding to the direction of circulation of the fluid in the primary channels 30 and by the arrows marked 36 corresponding to the direction of circulation of the fluid in the secondary channels 32. The arrows 34 are shown in dotted line since the primary channels are defined on an inside face of the intermediate plate 24 and are therefore not visible in FIG. 2. The arrows 36 are shown in solid line since the secondary channels are located on a top face of the intermediate plate 24 and are therefore visible in FIG. 2. The same applies to FIGS. 3 to 6. It is understood that the primary channels 30 and the secondary channels 32 are located on either side of said intermediate plate 24.

Said primary channels 30 and said secondary channels 32 are arranged such that they are alternating, preferably over the whole extent of each of the exchange surfaces 8. The heat exchange surfaces 8 thus allow an exchange of heat between the fluid circulating in said primary and secondary channels, on the one hand, and said component 6 on the other hand. The intermediate plate 24 has corrugations for defining a bottom and side walls of the primary channels, not visible in FIG. 2, and a bottom 38 and side walls 40 of the secondary channels 32.

The primary channels 30 are closed by said second outer plate. On the opposite side to the side of the passage of the fluid, the bottom of the primary channels is secured to the bottom 16 of said first outer plate 12. The secondary channels 32 are closed by the bottom 16 of said first outer plate 12. On the opposite side to the side of the passage of the fluid, the bottom of the secondary channels is secured to said second outer plate.

The side walls of the primary and secondary channels are preferably substantially straight.

Said first body 28 further comprises a collector box for the passage of the fluid from the primary channels 30 to the secondary channels 32, in the direction of the arrows marked 37. In said collector boxes, the fluid makes a semi-turn, as in the example shown, going from one side of the intermediate plate 24 to the other. The configuration of the intermediate plate 24 in this regard will be described in more detail below.

According to the invention, a width l1 of the primary channels 30 is less than a width l2 of the secondary channels 32. As explained above, this promotes a uniform exchange of heat between the fluid circulating in the primary and secondary channels, on the one hand and, on the other hand, the component 6, over the whole extent of each of the heat exchange surfaces 8.

Said primary 30 and secondary 32 channels advantageously have a width, respectively l1 and l2, which is constant facing said exchange surfaces 8. However, note that, in the exchanger according to the invention, a surface portion of the row of cells at each end of the groups, in the second direction Y, may go beyond said exchange surfaces 8 (see FIG. 7).

A preferred width ratio l2/l1 between the secondary channel(s) 32 and the primary channel(s) 30' is between 1.5 and 4, preferably around 2. It was observed that, below 2, uniformization of the exchange of heat at the surface of the exchanger was limited. It was also observed that, above 4, the exchanger had problems in terms of resistance to internal pressure. Moreover, the advantage in terms of uniformization of the exchange of heat at the surface reached a limit when the head losses became too high.

In the example shown, the first body 28 has two longitudinal edges 42, each bordered by two primary semi-channels 30. These allow uniformization of the exchange of heat up to the edge of the exchange surfaces 8.

As shown in detail in FIGS. 3 and 4, the exchanger 1 comprises a manifold 44 for circulation of the fluid to the primary channels 30 and/or from the secondary channels 32. Said manifold 44 has an inlet 46 and/or an outlet 48 for the passage of the fluid, in communication with the inlet 20 and outlet 22 connectors, respectively. Said inlet 46 formed both through the first outer plate 12 and the intermediate plate 24. Said outlet 48 is formed only through the first outer plate 12.

The intermediate plate 24 has a median portion 80 defining, in combination with the first and second outer plates, two chambers for circulation of the fluid. A first 82 of the chambers, visible in FIG. 4, forms an inlet chamber in communication with the primary channels 30. It is located between said median portion 80 and the second outer plate. It is supplied by the inlet 46 of said manifold 44. A second 84 of the chambers, visible in FIG. 3, forms an outlet chamber in communication with the secondary channels 32. It is located between said median portion 80 and the bottom of the first outer plate. It is in communication with said outlet 48 of the manifold 44. Said median portion 80 is preferably located, along the axis Z, at an equal distance from the first and second outer plates.

As will be described in detail below, the exchanger is configured to promote good distribution of the fluid in each of the primary 30 and secondary 32 channels, depending on the position of said inlet/outlet 46, 48.

To this end, the first body 28 in this case comprises a connection zone 50, located between the manifold 44 and an inlet 52 of the primary channels 30 and/or between an outlet 54 of the secondary channels 32 and the manifold 44.

As shown more clearly in FIG. 4, said connection zone 50 comprises first convergent portions 56 for the passage of the fluid between the manifold 44 and the inlet 52 of the primary channels 30. The term "convergent portion", means a portion of which the cross section, in particular the width, decreases in the direction of flow of the fluid. Said first convergent portions 56 are extended by a primary neck 58 in communication with the inlet 52 of the primary channels 30. Said primary necks 58 extend in the direction of longitudinal extension Y of said primary channels 30, each of the primary necks 58 retaining a constant width.

That being so, a width of the primary necks 58 differs depending on how close said primary necks 58 are to the fluid inlet 46 of the manifold. The primary neck or necks closest to said inlet 46 of the manifold 44 have a smaller width than the primary neck or necks 58 furthest away from said inlet 46 of the manifold 44. In this case, the three primary necks 58 closest to the inlet 46 of the manifold 44 have substantially the same width and the primary neck 58 furthest away, on the right hand side in the figure, has a greater width.

As shown more clearly in FIG. 3, said connection zone 50 further comprises second convergent portions 60 for the passage of the fluid between the manifold 44 and the outlet 54 of the secondary channels 32. Said second convergent portions are extended by a secondary neck 62 in communication with the manifold 44.

Said secondary necks 62 extend in the direction Y of longitudinal extension of said secondary channels 32, each of the secondary necks 62 retaining a constant width.

That being so, a width of the secondary necks 62 differs depending on how close said secondary necks are to the fluid outlet 48 of the manifold 44. The secondary neck or necks closest to said outlet 48 of the manifold 44 have a smaller width than the secondary neck or necks 62 furthest away from said outlet 48 of the manifold 44. In this case, the secondary necks 62 have a width which increases in the direction away from said outlet 48 of the manifold 44, the position of which, in projection, is marked S in the figure.

The secondary necks 62 are between the first convergent portions 56. This moreover has the effect of modifying the size of an inlet width of said first convergent portions 56, the first convergent portion or convergent portions 56 located in the vicinity of the inlet 46 of the manifold 44 having a smaller opening than the first convergent portion or convergent portions 56 furthest away.

The intermediate plate 24 has corrugations for defining a bottom and side walls of the first and second convergent portions 56, 60 and of the primary and/or secondary necks 58, 62. The bottom of the first convergent portions 56 and of the primary necks 58 is located at the same level, in the direction Z, as the bottom 41 of the primary channels 30. The bottom 40 of the second convergent portions 60 and of the secondary necks 62 is located at the same level, in the direction Z, as the bottom 40 of the secondary channels 32. The side walls of the first and second convergent portions 56, 60 and of the primary and secondary necks 58, 62 are respectively in the continuation of the longitudinal walls 41, 40 of the primary and secondary conduits 30, 32.

Said manifold 44 comprises primary stamped portions 64, protruding in FIG. 4, for controlling the flow of the fluid between the inlet 46 of the manifold 44 and the primary channels 30 and secondary stamped portions 66, protruding in FIG. 3, for controlling the flow of the fluid between the secondary channels 32 and the outlet 48 of the manifold 44.

Said primary and secondary stamped portions 64, 66 have different shapes depending on their position in the manifold 44, for example a substantially circular, elongate, chevron or three-branched star shape.

In FIG. 4, it can be seen that some of the primary stamped portions 64 are located at the inlet of the first convergent portions 56. Those closest to said inlet 46 of the manifold 44 have a chevron shape while those furthest away have an elongate shape. Others are located on the same line, in the direction X, as said inlet 46 of the manifold 44. Those closest have a three-branched star shape while the others have an elongate or circular shape.

In FIG. 3, it can be seen that some of the secondary stamped portions 66 are located at the outlet of the second convergent portions 60. Those closest to said outlet 48 of the manifold 44 have a chevron shape while those furthest away have an elongate shape. Others are located on the same line, in the direction X, as said outlet 48 of the manifold 44. Those closest have a three-branched star shape while the others have an elongate or circular shape.

Again in FIG. 4, note that said manifold 44 comprises a stamped portion 68, referred to as the inlet stamped portion, creating a chamber 70 for distribution of the fluid in the vicinity of the fluid inlet 46. Said inlet stamped portion 68 is oriented identically to the secondary stamped portions 66. Said inlet stamped portion 68 has an annular configuration. It makes it possible to prevent excessive speed of the fluid entering the manifold 44, given the low height of the inlet chamber 82.

In an alternative that has not been shown, said inlet stamped portion and the first convergent portion associated with one of the primary channels, located in the vicinity of said inlet of the manifold, are in the continuation of one another.

The intermediate plate 24 has corrugations for defining the primary 64 and/or secondary 66 stamped portions. An apex of the primary stamped portion 64 is located at the same level, in the direction Z, as the bottom of the secondary channels 32. An apex of the secondary stamped portion 66 is located at the same level, in the direction Z, as the bottom of the primary channels 30.

As shown in FIGS. 5 and 6, said intermediate plate 24 defines a bottom 92 and side walls 94 of the collector boxes for passage of the fluid from the primary channels 30 to the secondary channels 32.

Said collector box has hollows 72 forming deflector surfaces 74 for guiding the fluid in said box from one of the primary channels 30 to the neighboring secondary channels 32.

Said intermediate plate 24 has, at said collector boxes, slots 76, each slot 76 being located facing an emerging end of one of the secondary channels 32 to allow the passage of the fluid from one side of the plate to the other. The slots 76 are made, for example, by removing material before stamping the intermediate plate 24 or by puncturing during stamping.

In an alternative that has not been shown, the intermediate plate consists of a corrugated fin defining said primary and secondary channels, the collector box, and even the connection zone being defined by stamping said first and/or second outer plates.

Referring again to FIG. 1, as will have been understood, the exchanger in this case comprises a second body 78, symmetrical to the first body 28 about the manifold 44.

The stack of plates defines said manifold 44, said first body 28 and said second body 78.

As is clear from the above, the component 4 is in contact with said first body 28 and/or said second body 78 facing said primary and secondary channels 30, 32. More specifically, the cells 6 are located on each side of said first body 28 and of said second body 78. They are preferably secured to said first and/or second body 28, 78.

As shown more clearly in FIG. 7, each of the cells 6 is facing both one of the primary channels 30, 30' and one of the secondary channels 32, most of the end surface of the cells facing one of the secondary channels 32.

It can also be seen in this figure that said connection zone has an extension, along the axis Y, substantially identical to the diameter of the cells 6.

The invention claimed is:

1. A heat exchanger for an electrical component, said exchanger comprising:
a first body defining at least a primary channel and at least a secondary channel, which are parallel and adjacent, in which fluid circulates in series from the primary channel to the secondary channel, in opposite directions,
said first body having at least one exchange surface for exchanging heat between the fluid circulating in said primary channel and said secondary channel, and said electrical component, a width of the primary channels being less than a width of the secondary channels,
wherein the width ratio between the secondary channel and the primary channel is between 1.5 and 4.

2. The exchanger as claimed in claim 1, wherein the exchanger comprises a manifold for circulation of the fluid to the primary channel and from the secondary channel, said manifold having an inlet and an outlet for the passage of the fluid.

3. The exchanger as claimed in claim 2, wherein the first body comprises a connection zone located between the manifold and an inlet of the primary channel and between an outlet of the secondary channel and the manifold.

4. The exchanger as claimed in claim 3, wherein said connection zone comprises first convergent portions for the passage of the fluid between the manifold and the inlet of the primary channel, said first convergent portions comprising a primary neck in communication with the inlet of the primary channel.

5. The exchanger as claimed in claim 4, wherein said connection zone comprises second convergent portions for the passage of the fluid between the manifold and the outlet of the secondary channel, said second convergent portions comprising a secondary neck in communication with the manifold.

6. The exchanger as claimed in claim 5, wherein the secondary neck is located between the first convergent portions.

7. The exchanger as claimed in claim 2, wherein said manifold comprises primary stamped portions for controlling the flow of fluid between the inlet of the manifold and the primary channel.

8. The exchanger as claimed in claim 2, wherein said manifold comprises a stamped portion, referred to as the inlet stamped portion, creating a fluid distribution chamber in the vicinity of the inlet of the manifold.

9. An assembly comprising:
an electrical component; and
an exchanger comprising:
a first body defining at least a primary channel and at least a secondary channel, which are parallel and adjacent, in which fluid circulates in series from the primary channel to the secondary channel, in opposite directions,
said first body having at least one exchange surface for exchanging heat between the fluid circulating in said primary channel, said secondary channel, and said electrical component, a width of the primary channels being less than a width of the secondary channels,
wherein the width ratio between the secondary channel and the primary channel is between 1.5 and 3.

10. The exchanger as claimed in claim 2, wherein said manifold comprises secondary stamped portions for controlling the flow of fluid between the secondary channel and the outlet of the manifold.

11. A heat exchanger for an electrical component, said exchanger comprising:
a first body defining at least a primary channel and at least a secondary channel, which are parallel and adjacent, in which fluid circulates in series from the primary channel to the secondary channel, in opposite directions,
said first body having at least one exchange surface for exchanging heat between the fluid circulating in said primary channel and said secondary channel, and said electrical component, a width of the primary channels being less than a width of the secondary channels;
wherein the exchanger comprises a manifold for circulation of the fluid to the primary channel and from the secondary channel, said manifold having an inlet and an outlet for the passage of the fluid; and
wherein said manifold comprises primary stamped portions for controlling the flow of fluid between the inlet of the manifold and the primary channel.

\* \* \* \* \*